US010069762B1

(12) United States Patent
Hooda et al.

(10) Patent No.: US 10,069,762 B1
(45) Date of Patent: Sep. 4, 2018

(54) GROUP BASED MULTICAST IN NETWORKS

(71) Applicant: Cisco Technology, Inc., San Jose, CA (US)

(72) Inventors: Sanjay Kumar Hooda, Pleasanton, CA (US); Kaushik Kumar Dam, San Jose, CA (US); Sandesh Kumar Narappa Bheemanakone, Milpitas, CA (US); Victor M. Moreno, Carlsbad, CA (US); Shivangi Sharma, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 15/446,802

(22) Filed: Mar. 1, 2017

(51) Int. Cl.
*H04H 20/71* (2008.01)
*H04L 12/931* (2013.01)
*H04W 72/12* (2009.01)
*H04W 74/00* (2009.01)

(52) U.S. Cl.
CPC ......... *H04L 49/201* (2013.01); *H04W 72/121* (2013.01); *H04W 74/002* (2013.01)

(58) Field of Classification Search
None
See application file for complete search history.

(56) References Cited

U.S. PATENT DOCUMENTS

| | | | | |
|---|---|---|---|---|
| 7,664,110 B1* | 2/2010 | Lovett | ................... | H04L 49/351 370/392 |
| 7,933,268 B1* | 4/2011 | Melman | ................... | H04L 12/18 370/245 |
| 8,804,720 B1* | 8/2014 | Rainovic | ............... | H04L 12/185 370/229 |
| 2003/0149771 A1* | 8/2003 | Wookey | .............. | H04L 12/1886 709/227 |
| 2009/0097485 A1* | 4/2009 | Okada | ................... | H04L 12/185 370/390 |
| 2014/0026174 A1* | 1/2014 | Baykal | ............... | H04N 21/4384 725/111 |
| 2014/0269415 A1* | 9/2014 | Banavalikar | .......... | H04L 12/185 370/254 |
| 2015/0326939 A1* | 11/2015 | Dieselberg | ......... | H04N 21/6405 725/109 |
| 2018/0109929 A1* | 4/2018 | Ly | ........................... | H04W 4/06 |

* cited by examiner

*Primary Examiner* — Ajit Patel
(74) *Attorney, Agent, or Firm* — Merchant & Gould P.C.

(57) ABSTRACT

Group based multicasts may be provided. First, a request may be received. The request may comprise a receiver tag, a request source identifier, and a request multicast group identifier. Next, a source tag corresponding to the request source identifier may be obtained and then it may be determined that a group corresponding to the receiver tag is allowed to access content from a source corresponding to the obtained source tag. In response to determining that the group corresponding to the receiver tag is allowed to access content from the source corresponding to the obtained source tag, content may be received from the source at a multicast group corresponding to the request multicast group identifier. The content may then be forwarded to a receiver corresponding to the request.

20 Claims, 4 Drawing Sheets

US 10,069,762 B1

GROUP BASED MULTICAST IN NETWORKS

TECHNICAL FIELD

The present disclosure relates generally to group based multicasts.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
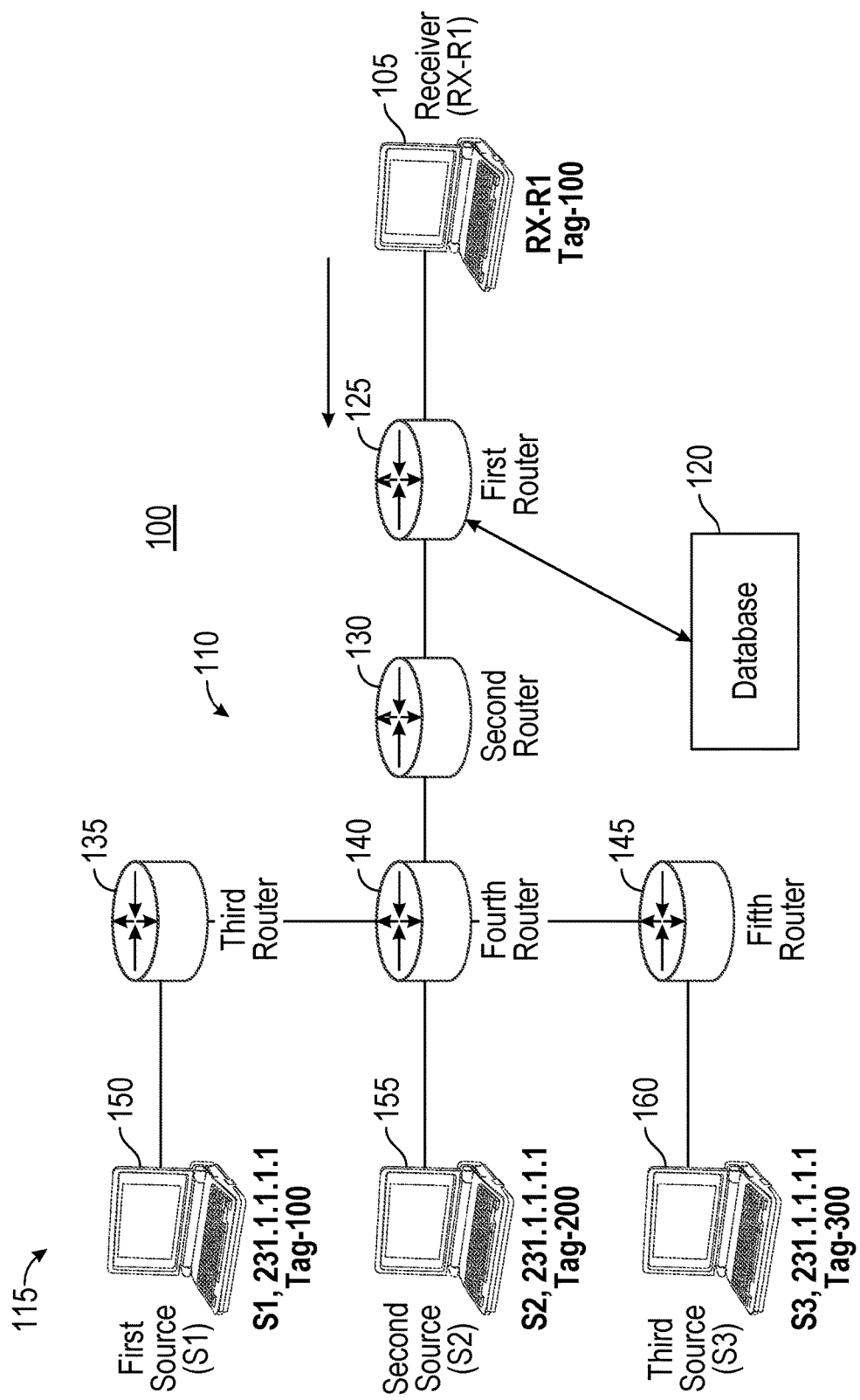
FIG. 1 is a block diagram of a network.

Group based multicasts may be provided. First, a request may be received. The request may comprise a receiver tag, a request source identifier, and a request multicast group identifier. Next, a source tag corresponding to the request source identifier may be obtained and then it may be determined that a group corresponding to the receiver tag is allowed to access content from a source corresponding to the obtained source tag. In response to determining that the group corresponding to the receiver tag is allowed to access content from the source corresponding to the obtained source tag, content may be received from the source at a multicast group corresponding to the request multicast group identifier. The content may then be forwarded to a receiver corresponding to the request.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may utilize user/device groups to restrict multicast traffic between a limited set of users/devices. Embodiments of the disclosure may restrict multicast to a predetermined group of senders and receivers. This may allow an enterprise to permit different user-groups in their enterprise to have restrictive multicast senders and receivers that cater to their part of the enterprise in a secured manner.

Embodiments of the disclosure may use a Scalable Group Tag (SGT) in both fabric and non-fabric environments to restrict a multicast stream to a specific user or users. For example, embodiments of the disclosure may restrict multicast within the same user/device group (e.g., having the same SGT). A department (e.g., engineer group) within an enterprise may sets up a multicast server, but may want to restrict the access to the multicast server to a predetermined group or groups of users/devices having a predetermined SGT value.

Embodiments of the disclosure may obtain an SGT of a multicast receiver. Then, based on the receiver's SGT and a sender's (e.g., source) SGT of the desired multicast group, the multicast traffic may be allowed or denied based on policy. Embodiments of the disclosure may use SGT Exchange Protocol (SXP) to Identity Services Engine (ISE), for example, to learn the SGT for the sender. The same information may be used for filtering traffic that might have been received for the same multicast group, but from a source that is from a non-permitted SGT group. Embodiments of the disclosure may support environments: i) where one or more receivers within the same SGT group are connected to a port and ii) when multiple receivers of different SGT groups are connected to a single port. Accordingly, embodiments of the disclosure may use user/device group to restrict multicast traffic between a limited set of users/devices. Consequently, a multicast may be restricted to a controller group of senders and receivers. This may allow an enterprise to control access by different user-groups in the enterprise to multicast flows that may cater to the different user-groups in a secure manner.

FIG. 1 is a block diagram of a network 100. As shown in FIG. 1, network 100 may comprise a receiver 105, a plurality of routers 110, a plurality of sources 115, and a database 120. Plurality of routers 110 may comprise a first router 125, a second router 130, a third router 135, a fourth router 140, and a fifth router 145. Plurality of sources 115 may comprise a first source 150, a second source 155, and a third source 160. Any one or more of receiver 105, plurality of routers 110, plurality of sources 115, and database 120 may comprise a computing device 400 as described in more detail below with respect to FIG. 4.

Plurality of routers 110 may be configured to utilize Protocol-Independent Multicast (PIM). PIM may comprise a family of multicast routing protocols for Internet Protocol (IP) networks that may provide one-to-many and many-to-many distribution of data over a Local Area Network (LAN), Wide Area Network (WAN), or the Internet for example.

PIM may be considered protocol-independent because PIM may not include its own topology discovery mechanism, but instead may use routing information supplied by other routing protocols.

Database 120 may comprise, but is not limited to, an Identity Services Engine (ISE). ISE may comprise a network administration resource that may enable creation and enforcement of security and access policies for endpoint devices (e.g., receiver 105) connected to routers and switches (e.g., plurality of routers 110.) ISE may simplify identity management across diverse devices and applications. Consistent with embodiments of the disclosure, tags (e.g., receiver tag, source tag) may comprise, for example, SGTs. Table 1 below shows an example of information that may be stored in database 120 corresponding to network 100 of FIG. 1.

TABLE 1

| S. No. | Source | User/Device Group | Multicast-Group |
|---|---|---|---|
| 1 | First Source (S1) | Tag-100 | 231.1.1.1 |
| 2 | Second Source (S2) | Tag-200 | 231.1.1.1 |
| 3 | Third Source (S3) | Tag-300 | 231.1.1.1 |
| Receiver | | User/Device Group | Multicast-Group |
| 1 | First Receiver (R1) | Tag-100 | 231.1.1.1 |

Figure 2:
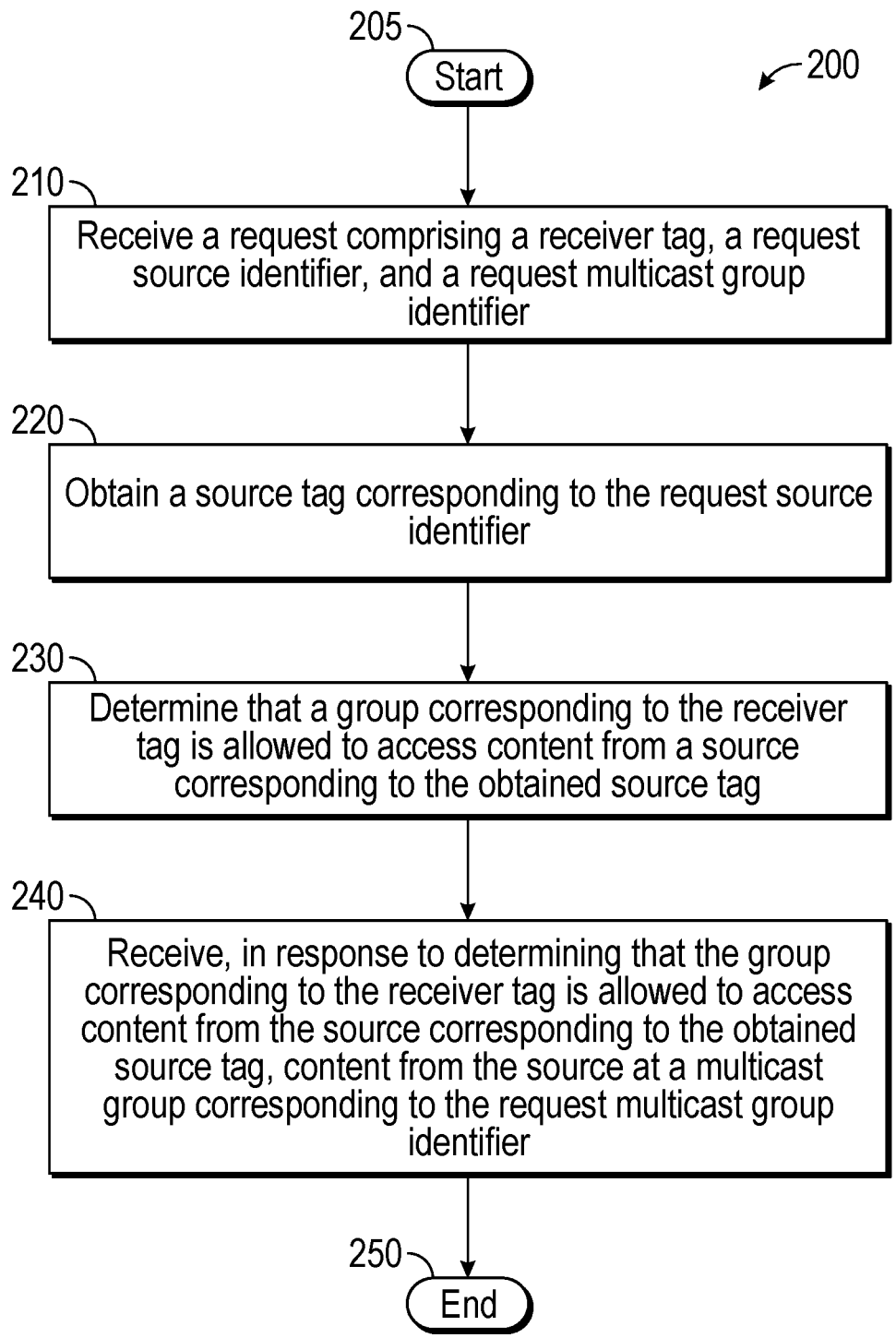
FIG. 2 is a flow chart of a method for providing group based multicasts.

FIG. 2 is a flow chart setting forth the general stages involved in a method 200 consistent with an embodiment of the disclosure for providing group based multicasts. Method 200 may be implemented using first router 125 that may be implemented using computing device 400 as described in more detail below with respect to FIG. 4. Ways to implement the stages of method 200 will be described in greater detail below. Method 200 may illustrate, for example, an Internet Group Management Protocol Version 3 (IGMPv3) implementation.

Method 200 may begin at starting block 205 and proceed to stage 210 where first router 125 may receive a request comprising a receiver tag (e.g., an SGT comprising Tag-100), a request source identifier (e.g., S1), and a request multicast group identifier (e.g., 231.1.1.1). 51 may correspond to first source 150. For example, first router 125 may receive a join request (e.g., an IGMPv3 join request) from receiver 105. In other words, the request may be for (S1, MG1) where MG1 may comprise 231.1.1.1.

From stage 210, where first router 125 receives the request, method 200 may advance to stage 220 where first router 125 may obtain a source tag corresponding to the request source identifier (e.g., S1). For example, first router 125 may send a lookup request to database 120 for the source tag for S1 (i.e., first source 150). As shown in Table 1, the source tag for S1 may comprise Tag-100. In another embodiment, the information stored in database 120 may be statically configured on first router 125.

Once first router 125 obtains the source tag in stage 220, method 200 may continue to stage 230 where first router 125 may determine that a group corresponding to the receiver tag is allowed to access content from a source corresponding to the obtained source tag. For example, first router 125 may check policies in database 120 and may determine that the policies may allow users/devices-group (e.g., corresponding to receiver 105) with a predetermined receiver tag (e.g., Tag-100) to access content from sources (e.g., first source 150) with a predetermined source tag (e.g., Tag-100).

After first router 125 determines that the group corresponding to the receiver tag is allowed to access content from the source corresponding to the obtained source tag in stage 230, method 200 may proceed to stage 240 where first router 125 may receive, in response to determining that the group corresponding to the receiver tag is allowed to access content from the source corresponding to the obtained source tag, content from the source at a multicast group corresponding to the request multicast group identifier. For example, first router 125 may follow PIM protocol and may receive the multicast content from first source 150 (e.g., S1) to group MG1 (e.g., 231.1.1.1) in this example (S1, 231.1.1.1) and forwards the received content to receiver 105. Once first router 125 receives content in stage 240, method 200 may then end at stage 250.

Figure 3:
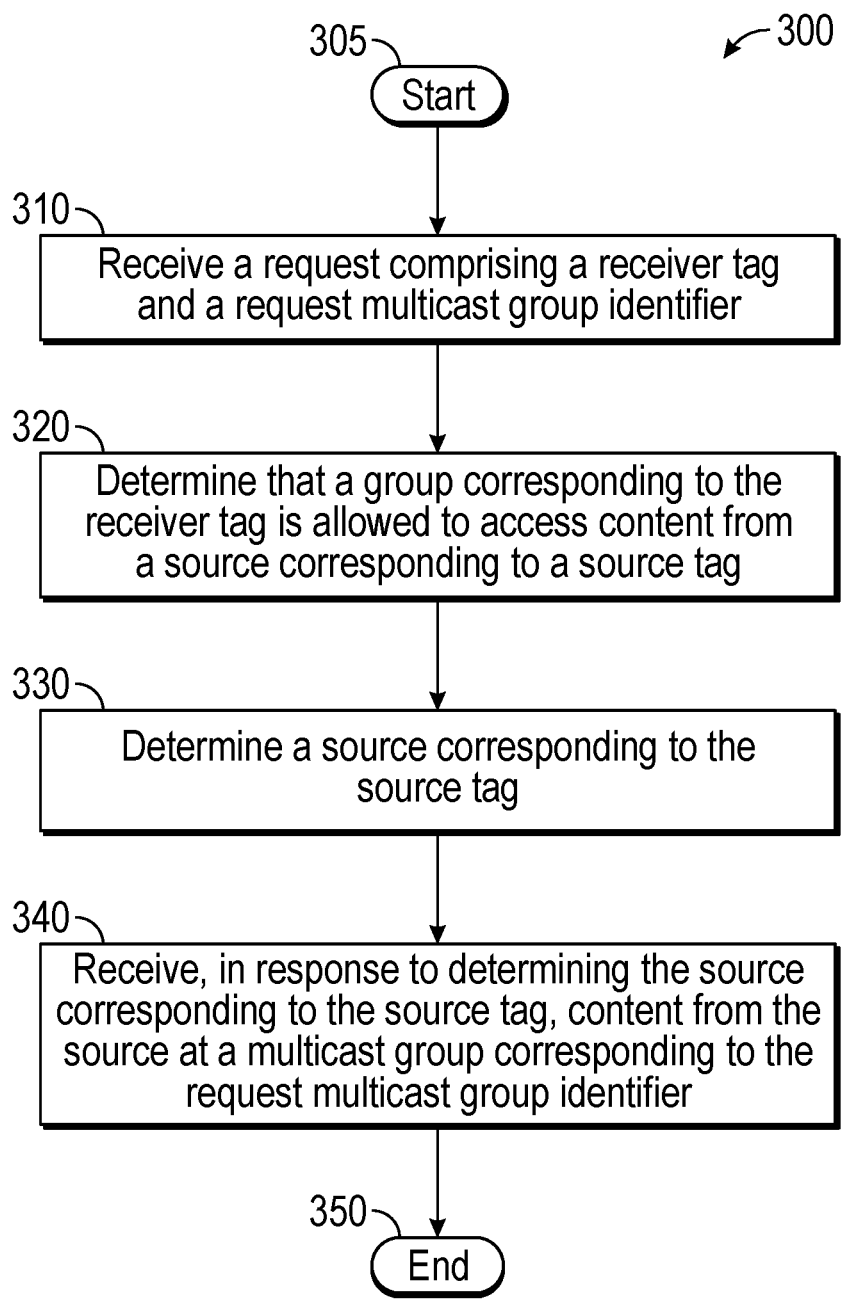
FIG. 3 is a flow chart of a method for providing group based multicasts.

FIG. 3 is a flow chart setting forth the general stages involved in a method 300 consistent with an embodiment of the disclosure for providing group based multicasts. Method 300 may be implemented using first router 125 that may be implemented using computing device 400 as described in more detail below with respect to FIG. 4. Ways to implement the stages of method 300 will be described in greater detail below. Method 300 may illustrate, for example, an Internet Group Management Protocol Version 2 (IGMPv2) implementation.

Method 300 may begin at starting block 305 and proceed to stage 310 where first router 125 may receive a request comprising a receiver tag (e.g., an SGT comprising Tag-100) and a request multicast group identifier (e.g., 231.1.1.1). For example, first router 125 may receive a join request (e.g., an IGMPv2 join request) from receiver 105. In other words, the request may be for (*, MG1) where MG1 may comprise 231.1.1.1.

From stage 310, where first router 125 receives the request, method 300 may advance to stage 320 where first router 125 may determine that a group corresponding to the receiver tag is allowed to access content from a source corresponding to a source tag. For example, first router 125 may look at the receiver tag of the receiver 105 and may find that the receiver tag may comprise Tag-100. Next, first router 125 may obtain a policy (e.g., from database 120) that provides that receivers with Tag-100 may be allowed to get content from sources with particular tags (e.g., Tag-100).

Once first router 125 determines that the group corresponding to the receiver tag is allowed to access content from the source corresponding to the source tag in stage 320, method 200 may continue to stage 330 where first router 125 may determine a source corresponding to the source tag. For example, from the determined allowed source tag (e.g., Tag-100), the IP address of the corresponding source (e.g., first source 150) may be obtained. (This obtained IP address, for example, may be used in a conversion from IGMPv2-to-IGMPv3, for example, the request may be converted from (*, MG1) to (S1, MG1).) In other words, embodiments of the disclosure make use the receiver tag in a policy look-up to determine a source tag that the receiver tag is allowed access to and then identify a source that corresponds to the allowed source tag.

After first router 125 determines the source corresponding to the source tag in stage 330, method 200 may proceed to stage 340 where first router 125 may receive, in response to determining the source corresponding to the source tag, content from the source at a multicast group corresponding to the request multicast group identifier. For example, first router 125 may follow PIM protocol and may receive the multicast content from first source 150 (e.g., S1) to group MG1 (e.g., 231.1.1.1) in this example (S1, 231.1.1.1) and forwards the received content to receiver 105. Once first router 125 receives content in stage 340, method 200 may then end at stage 350.

Figure 4:
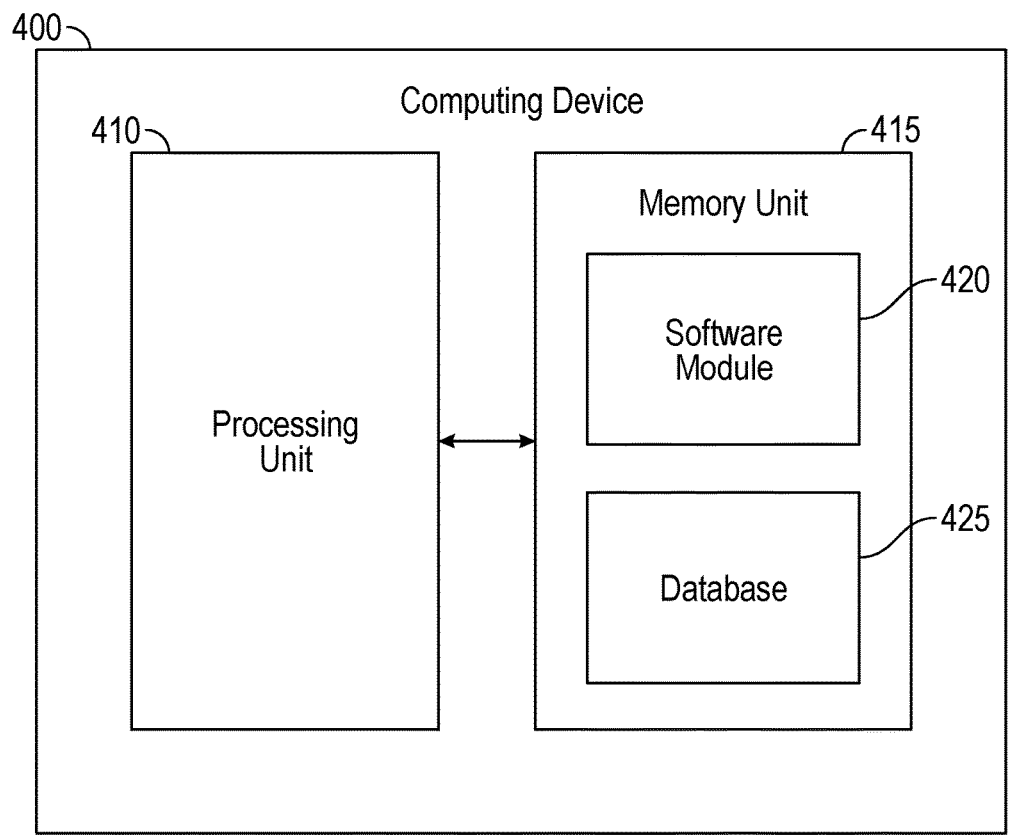
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform processes for providing group based multicasts, including for example, any one or more of the stages from method 200 described above with respect to FIG. 2 and any one or more of the stages from method 300 described above with respect to FIG. 3. Computing device 400, for example, may provide an operating environment for any one or more of receiver 105, plurality of routers 110, plurality of sources 115, and database 120. Any one or more of receiver 105, plurality of routers 110, plurality of sources 115, and database 120 may operate in other environments and are not limited to computing device 400.

Computing device 400 may be implemented using a personal computer, a network computer, a mainframe, a switch, a router, or other similar microcomputer-based device. Computing device 400 may comprise any computer operating environment, such as hand-held devices, multi-processor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a request comprising a receiver tag, a request source identifier, and a request multicast group identifier;
   obtaining a source tag corresponding to the request source identifier;

determining that a group corresponding to the receiver tag is allowed to access content from a source corresponding to the obtained source tag; and receiving, in response to determining that the group corresponding to the receiver tag is allowed to access content from the source corresponding to the obtained source tag, content from the source at a multicast group corresponding to the request multicast group identifier.

2. The method of claim 1, further comprising forwarding the content to a receiver corresponding to the request.

3. The method of claim 1, wherein receiving the request comprises receiving the request comprising a join request.

4. The method of claim 1, wherein receiving the request comprises receiving the request comprising a IGMPv3 join request.

5. The method of claim 1, wherein obtaining the source tag comprises obtaining the source tag from an Identity Services Engine (ISE).

6. The method of claim 1, wherein obtaining the source tag comprises obtaining the source tag from information statically configured on a router.

7. The method of claim 1, wherein determining that the group corresponding to the receiver tag is allowed to access content from the source corresponding to the obtained source tag comprises determining that the group corresponding to the receiver tag is allowed to access content from the source corresponding to the obtained source tag from a policy in an Identity Services Engine (ISE).

8. The method of claim 1, wherein receiving the content from the source comprises receiving the content using Protocol-Independent Multicast (PIM) routing.

9. A method comprising:
receiving a request comprising a receiver tag and a request multicast group identifier;
determining that a group corresponding to the receiver tag is allowed to access content from a source corresponding to a source tag;
determining a source corresponding to the source tag; and
receiving, in response to determining the source corresponding to the source tag, content from the source at a multicast group corresponding to the request multicast group identifier.

10. The method of claim 9, further comprising forwarding the content to a receiver corresponding to the request.

11. The method of claim 9, wherein receiving the request comprises receiving the request comprising a join request.

12. The method of claim 9, wherein receiving the request comprises receiving the request comprising a IGMPv2 join request.

13. The method of claim 9, wherein determining that the group corresponding to the receiver tag is allowed to access content from the source corresponding to the source tag comprises determining that the group corresponding to the receiver tag is allowed to access content from the source corresponding to the source tag from an Identity Services Engine (ISE).

14. The method of claim 9, wherein receiving the content from the source comprises receiving the content using Protocol-Independent Multicast (PIM) routing.

15. An apparatus comprising:
a memory storage; and
a processing unit coupled to the memory storage, wherein the processing unit is operative to:
receive a request comprising a receiver tag, a request source identifier, and a request multicast group identifier,
obtain a source tag corresponding to the request source identifier,
determine that a group corresponding to the receiver tag is allowed to access content from a source corresponding to the obtained source tag, and
receive, in response to determining that the group corresponding to the receiver tag is allowed to access content from the source corresponding to the obtained source tag, content from the source at a multicast group corresponding to the request multicast group identifier.

16. The apparatus of claim 15, further comprising the processing unit being operative to obtain forward the content to a receiver corresponding to the request.

17. The apparatus of claim 15, wherein the processing unit being operative to receive the request comprises the processing unit being operative to receive the request comprising a join request.

18. The apparatus of claim 15, wherein the processing unit being operative to receive the request comprises the processing unit being operative to receive the request comprising a IGMPv3 join request.

19. The apparatus of claim 15, wherein the processing unit being operative to obtain the source tag comprises the processing unit being operative to obtain the source tag from an Identity Services Engine (ISE).

20. The apparatus of claim 15, wherein the processing unit being operative to obtain the source tag comprises the processing unit being operative to obtain the source tag from information statically configured on a router.

* * * * *